May 22, 1934.    G. LEFORT DES YLOUSES    1,959,480
PROCESS FOR THE PRODUCTION OF NITRATE OF LIME THROUGH ABSORPTION,
AT ELEVATED TEMPERATURES, OF NITROUS FUMES
Filed Aug. 6, 1931

INVENTOR
Gaston Lefort des Ylouses
BY
Emil Bönnelycke
ATTORNEY

Patented May 22, 1934

1,959,480

UNITED STATES PATENT OFFICE 1,959,480

PROCESS FOR THE PRODUCTION OF NITRATE OF LIME THROUGH ABSORPTION, AT ELEVATED TEMPERATURES OF NITROUS FUMES

Gaston Lefort des Ylouses, Boulogne-sur-Seine, France, assignor to L'Azote Francais, a corporation of France Application August 6, 1931, Serial No. 555,637
In France August 8, 1930

6 Claims. (Cl. 23—102)

It is well known that nitrous fumes contained for instance, in the electric arc gases are absorbed at elevated temperatures by quicklime, furnishing anhydrous nitrate of lime. However, such a process makes it necessary to use well calibrated and porous quicklime, obtained by dehydrating a slaked lime paste.

The dehydrated lime is extremely friable, the handling thereof being very difficult. Under these conditions, charging of the absorption cells becomes a very difficult operation, crushed pieces of lime, often reduced into powder, preventing a regular passing of the gases charged with nitrous fumes through the lime.

The present invention refers to a process and apparatus which avoids these difficulties.

Figure 1:
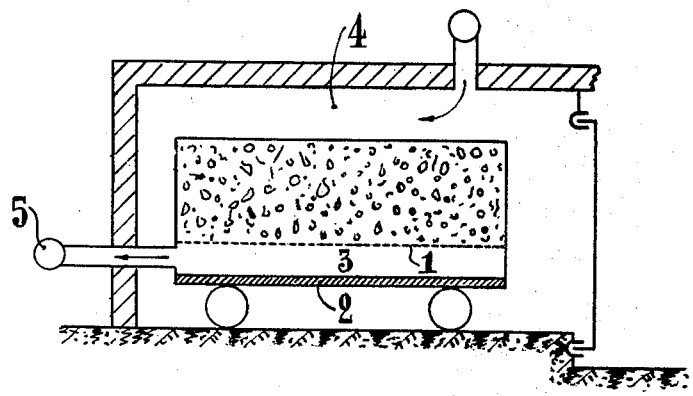
Figure 2:
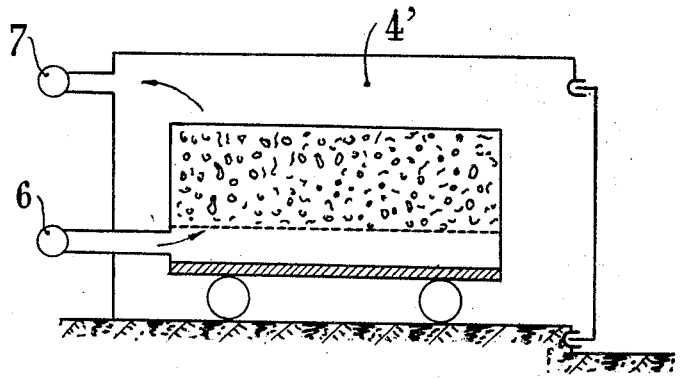

According to the present invention, the slaked lime, reduced to paste and granulated, is charged on a wagon of the type represented diagrammatically in Figures 1 and 2 of the annexed drawing, built so as to be able to resist high temperatures and carrying an inserted perforated bottom 1. The spacing between the bottom 2 and the inserted bottom 1 of the wagon constitutes a draught-chamber 3, which may be covered with a heat-insulating material.

The wagon is enclosed in a cell 4, (dehydrating cell), the draught-chamber 3 being connected to a pipe 5. The lime is progressively dehydrated by means of an air or hot gas current, the temperature of which is comprised between 400 and 700° C. When dehydration is sufficient, the cell is opened, the wagon withdrawn and then enclosed in a cell 4' serving as an absorption cell (Figure 2).

A certain number of such absorption cells are disposed in series or in parallel. The inlet and exhaust pipes 6 and 7, are respectively connected to the wagon and cell for the gases charged with nitrous fumes.

The draught-chamber 3 of the enclosed wagon is connected to one of these pipes; upon closing the cells-door and by means of a set of valves, a stream of nitrous fumes is forced to pass through the lime in the wagon.

Under these conditions there will be no charging or discharging of friable lime. The nitrous fumes—containing gases will then regularly pass through the lime and fixation will be brought about under good conditions.

I claim:

1. In a process for absorption of nitrous vapors by quicklime in the form of granules burned extremely porous and which are very fragile, the procedure comprising depositing granules of hydrated lime while still containing moisture into a container, placing the container in a dehydrating zone, subjecting the lime in the container to the action of gases at high temperatures to dry the lime and render the same porous, removing the container bodily from the dehydrating zone and placing the same in an absorption cell without in any way disturbing the lime contained therein which after burning is very fragile, passing gases containing nitrous vapors through the absorption cell in contact with the dehydrated lime to effect the absorption of the nitrous vapors in the lime and finally discharging the lime containing absorbed nitrous vapors from the container.

2. A process for the manufacture of calcium nitrate by the action of nitrous vapors on specially porous quicklime, comprising placing slaked lime in the form of a paste and granulated in a portable receptacle, burning the lime in the receptacle by passing a stream of hot gas therethrough to effect dehydration thereof and to provide highly porous absorbing bodies, subsequently moving the receptacle, without disturbing the fragile porous burned lime, to an absorption zone, and there passing nitrous vapors through the lime while undisturbed in the receptacle to absorb the nitrous vapors in the lime.

3. A process as set forth in claim 2, in which the slaked lime is dehydrated by a current of hot air.

4. A process as set forth in claim 2, in which manipulation of the porous lime is avoided by rolling the receptacle from the dehydration chamber to an absorption cell, and then connecting the receptacle so that the nitrous vapors will traverse the mass of porous lime.

5. A process as set forth in claim 2, in which the receptacles for the lime are in the form of wagons having a false perforated bottom providing a distribution chamber between the same and the real bottom thereof, and in which the distribution chamber is connected to a tube in both the dehydration and absorption chambers.

6. A process for the manufacture of calcium nitrate by the action of nitrous vapors on specially porous quicklime, comprising placing slaked lime in the form of a paste and granulated in a receptacle, burning the lime in the receptacle by passing a stream of hot gas therethrough to effect dehydration thereof and to provide highly porous absorbing bodies, maintaining the highly porous absorbing bodies in an undisturbed condition in the receptacle to preserve their highly porous structure, and passing nitrous vapors through the undisturbed bodies of lime to effect absorption of the nitrous vapors therein.

GASTON LEFORT DES YLOUSES.